United States Patent

Groot, Theodorus C. et al.

Patent Number: 4,727,281
Date of Patent: Feb. 23, 1988

[54] COLOR DISPLAY TUBE

[75] Inventors: Groot, Theodorus C.; Bert de Winkel, both of Eindhoven, Netherlands

[73] Assignee: U.S. Philips Corporation, New York, N.Y.

[21] Appl. No.: 642,744

[22] Filed: Aug. 20, 1984

Related U.S. Application Data

[63] Continuation of Ser. No. 536,226, Sep. 27, 1983, abandoned, which is a continuation of Ser. No. 270,444, Jun. 4, 1981, abandoned.

[30] Foreign Application Priority Data

Jun. 23, 1980 [NL] Netherlands ............ 8003610

[51] Int. Cl.$^4$ ............................................ H01J 29/07
[52] U.S. Cl. ...................................... 313/402; 313/404
[58] Field of Search ............... 313/402, 403, 408, 404, 313/405, 406, 407; 106/84

[56] References Cited

U.S. PATENT DOCUMENTS

| | | | |
|---|---|---|---|
| 2,223,924 | 12/1940 | Stephan | 313/479 |
| 3,548,235 | 12/1970 | Driedijk | 313/404 |
| 3,813,253 | 5/1974 | Neises | 106/84 |
| 3,943,399 | 3/1976 | Sedivy | 313/405 X |
| 4,045,701 | 8/1977 | Dougherty | 313/408 |

Primary Examiner—David K. Moore
Assistant Examiner—Sandra L. O'Shea
Attorney, Agent, or Firm—Robert J. Kraus

[57] ABSTRACT

A color display tube including a glass envelope having a substantially rectangular display window (20) with an upright edge (22). A metal plate (29) is connected in recesses in the corners of the edge (25) by means of a cement (51). The metal plates (29) serve as supporting means for the suspension of a color selection electrode (34) in the display tube.

3 Claims, 4 Drawing Figures

COLOR DISPLAY TUBE

This is a continuation, of application Ser. No. 536,226, filed Sept. 27, 1983, now abandoned which was a continuation of Ser. No. 270,444 filed June 4, 1981, now abandoned.

BACKGROUND OF THE INVENTION

The invention relates to a colour display tube comprising a glass envelope having a substantially rectangular display window includng an upright edge, having chamber-like recesses in the corners. The recesses are utilized to attach a substantially rectangular colour selection electrode which has cooperating suspension means in the corners.

Such a colour display tube is disclosed in U.S. Pat. No. 3,548,235. The display tube disclosed in the Patent comprises a display window with an upright edge having chamber-like recesses in the corners in. The corners of the colour selection electrode are attached to strip-shaped suspension members which are connected to clamping springs for insertion in the chamber-like recesses in the display window where they engage the walls of the recesses.

During insertion and removal of the clamping springs in, scratches easily occur on the walls of the recesses. Since the action of the clamping springs is based on friction, a large clamping force is required to obtain a good resistance to shocks of the tube. As a result of this large clamping force, stresses occur in the glass. This increases the possibility of fracture during the customary temperature treatments to which the display tube are subjected during manufacture. Furthermore, mediocre assembly reproducibility is obtained in such a tube when the clamping springs are repeatedly inserted in and removed from the recesses, as is necessary in the so-called flow-coating.

SUMMARY OF THE INVENTION

It is an object of the invention to provide a colour display tube in which the possibility of fracture during the manufacturing process of the tube is reduced and in which the resistance to shocks of the tube and the assembly reproducibility of the colour selection electrode is increased.

According to the invention, a colour display tube of the kind mentioned in the opening paragraph is characterized in that supporting means for a colour selection electrode comprise metal plate which are connected in the chamber-like recesses by means of a cement. The advantage of a supporting means for a colour selection electrode connected by means of cement is that the plate need be connected only once, which can be done very accurately, after which the position of the plate remains unambiguously determined. Additionally, when the design of the suspension means of a colour selection electrode changes, the connection to the plate can simply be adapted by adapting the shape of the plate or by connecting an extra element to the plate.

It is known from U.S. Pat. No. 4,045,701 to connect a colour selection electrode to the display window be means of a cement. However, this Patent does not relate to the suspension of a colour selection electrode by means of chamber-like recesses in the corners of the upright edge of a display window, but to the direct connection of a colour selection electrode to a flat display window.

It is also known from British Patent Specification No. 750,030 to connect a metal element to glass by means of a cement. However, this Specification does not relate to the suspension of a colour selection electrode in a display tube.

In a colour display tube configured in accordance with the invention the chamber-like recesses widen in a direction toward the corners of the display window and a metal plate is provided in each recess and is cemented by its facing edges to the upright side walls of the like recesses. The advantage of such a shape of the chamber-like recesses and connection of the metal plate is that the cement bond is not subjected to tensile load. When shocks or vibrations occur, the resulting forces are transferred directly to the metal plates by the side walls of the chamber.

In accordance with the invention the cement is a type which cures in a comparatively short period of time below a temperature of approximately 150° C. Cements suitable according to the invention are those composed of one or more of the binders sodium silicate, potassium silicate, aluminium phosphate or chromium phosphate to which one or more of the fillers steatite powder, sand, glass powder, alundum or magnesium oxide have been added. In addition to the above-mentioned fillers, other fillers may also be used by which the coefficient of expansion of the cement is adapted to be substantially equal to the coefficient of expansion of the display window glass.

A cement which cures rapidly at low temperature has the advantage that no high temperature oven process is necessary to cure the cement, which might change the position of the plate might be varied. The curing of the cement may be done in a simple heating process, for example by means of infrared lamps.

BRIEF DESCRIPTION OF THE DRAWING

The invention will be described in greater detail with reference to the accompanying drawing, in which.

DESCRIPTION OF THE PREFERRED EMBODIMENT

Figure 1:
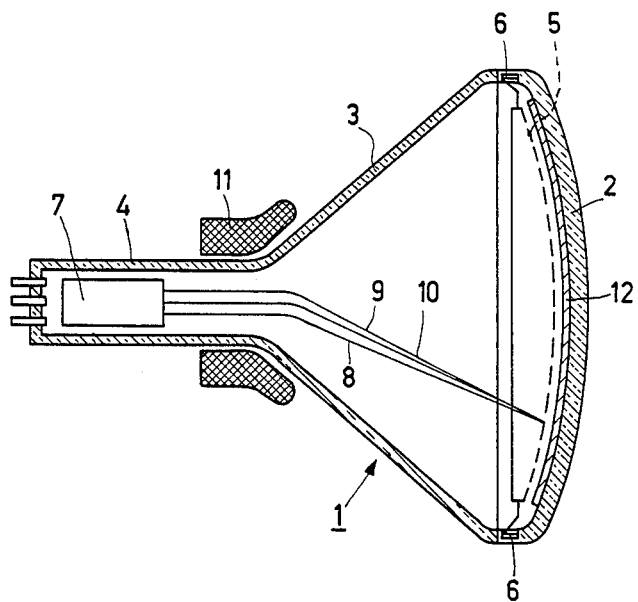
FIG. 1 is a sectional view of a colour display tube according to the invention.

A color display tube incorporating one form of the invention is shown in FIG. 1. The tube comprises a glass envelope 1 including a substantially rectangular display window 2, a conical central portion 3 and a neck 4. A pattern of phosphors 12 luminescing in the colours red, green and blue is provided on the display window 2. At a short distance from the display window 2 a colour selection electrode 5 is provided with the aid of suspension means 6. An electron gun 7 for producing three electron beams 8, 9 and 10 is mounted in the neck 4 of the tube. These three beams are deflected by means of a system of deflection coils 11 placed around the tube and intersect each other at the color selection electrode 5, after which each of the electron beams impinges only on one of the three phosphors provided on the display window.

Figure 2:
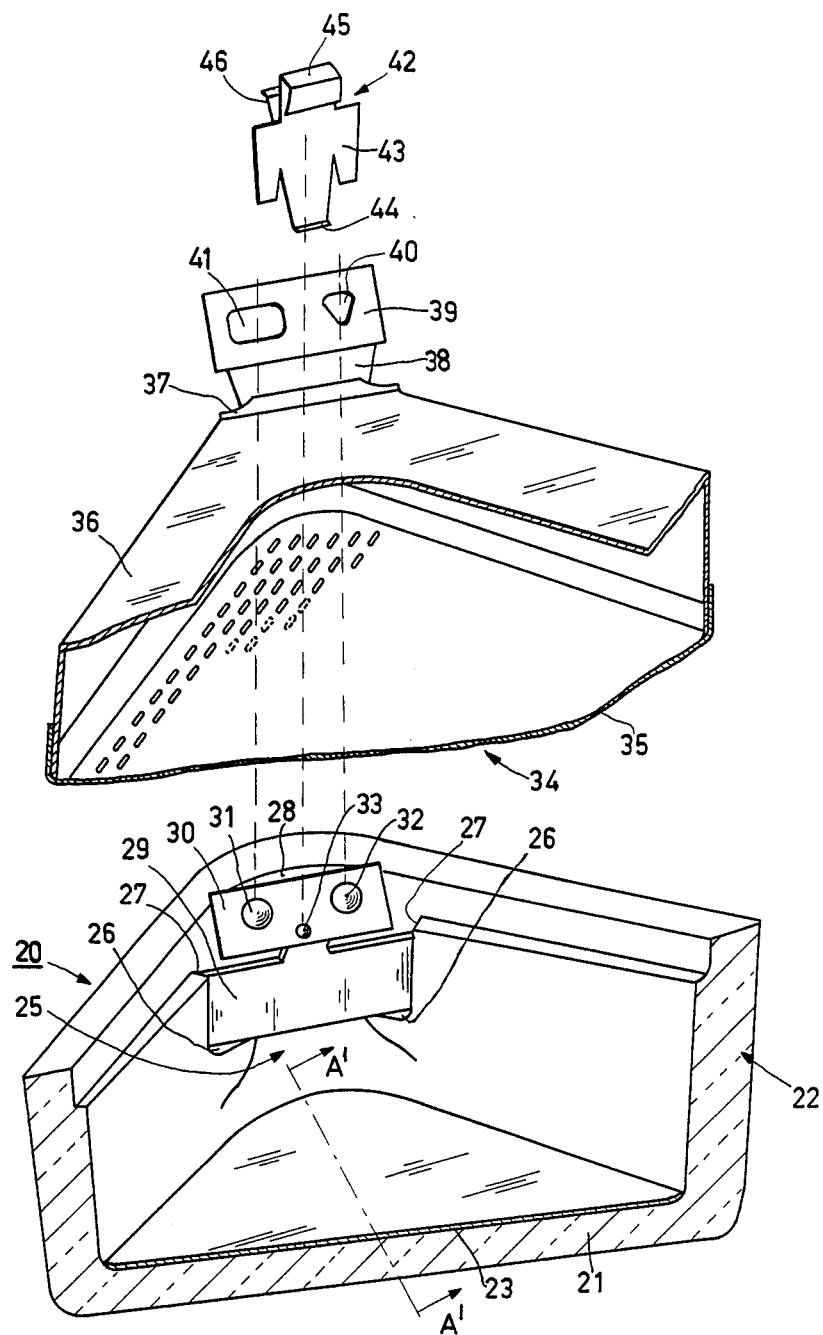
FIG. 2 is an exploded perspective view of a corner of the display window.

FIG. 2 is a perspective view of a corner of the glass display window. For clarity, the suspension of the colour selection electrode is shown as an exploded view. The display window 20 comprises a front portion 21 and an upright edge 22. The phosphor pattern 23 luminescing in three colours and covered with an aluminium coating is provided on the front portion 21. A chamber-like recess 25 is formed in the corner of the upright edge 22. The recess 25 is defined by two supporting surfaces 26 having two upright sides 27 and a rear surface 28. A metal plate 29 is fixed in the chamber-like recess 25 by means of a cement. The cement is provided between the side edges of the plate 29 and the side walls 27 of the recess 25. A supporting plate 30 forms part of the metal plate 29 or is connected thereto. The supporting plate 30 includes three embossments 31, 32 and 33. The embossments 31 and 32 are larger than the embossment 33. The supporting plate 30 encloses such an angle with the axis of the display tube that it extends at right angles or substantially at right angles to the electron beams directed towards the corner of the display window. The metal plate 29 with supporting plate 30 serves as a supporting means for a colour selection electrode 34. The colour selection electrode 34 is formed by an apertured mask sheet 35 having a bent-over edge to which a mask ring 36 is connected. A metal supporting strip 37 is connected to the corner of the colour selection electrode 34 for reinforcement. A leaf spring 38 is connected to the supporting strip 37 by means of a metal intermediate member. The leaf spring 38 is connected to a carrier plate 39 which has a triangular aperture 40 and a rectangular aperture 41. The colour selection electrode 34 is connected to the display window by placing the carrier plate 39 on the supporting plate 30. The spherical embossments 31 and 32 fall partly through the aperatus 40 and 41 and the carrier plate 39 engages the embossment 33. The spherical embossment 32 engages the edge of the triangular aperture 40 at three points and the spherical embossment 31 engages the edge of the rectangular aperture 41 at two points. The supporting plate 30 and the carrier plate 39 are held together by a clamping member 42 which is formed by a resilient metal plate 43 having one end 44 bent-over. The other end 45 is also bent and constitutes a spring which clamps together the supporting plate 30 and the carrier plate 39. A lug 46, facilitating detachment of the clamping member 42, is connected to the metal plate 43. The position of the carrier plate 39 relative to the supporting plate 30 is unambiguously fixed in this manner in all directions.

Figure 3:
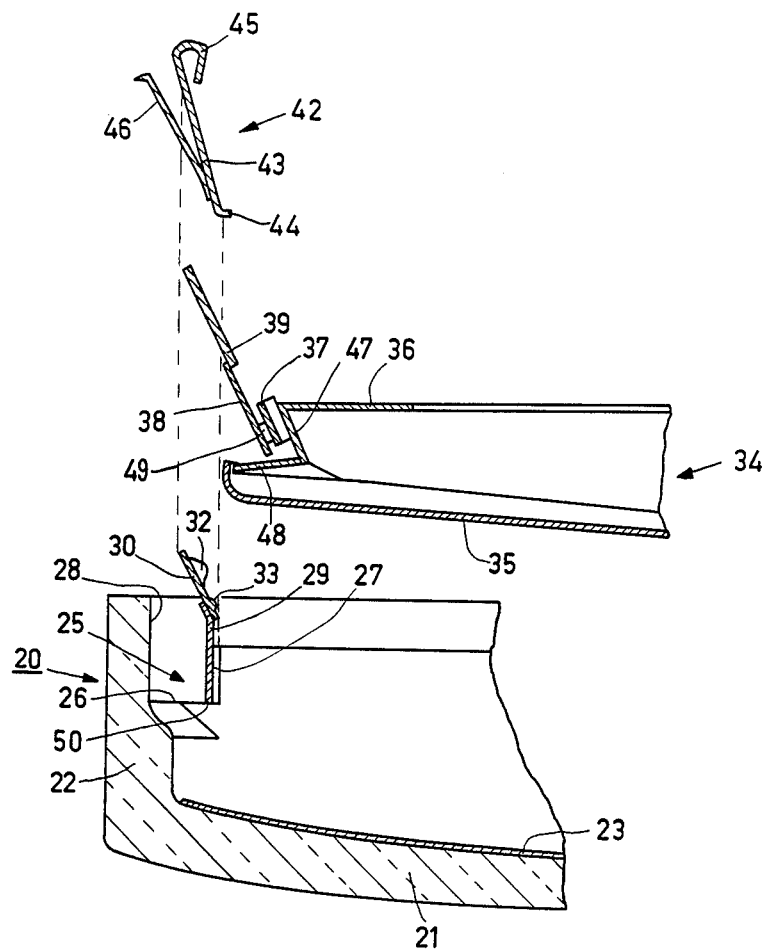
FIG. 3 is a sectional view taken on the line A'A' of FIG. 2.

FIG. 3 is a sectional view taken on the line A'A' of FIG. 2. The colour selection electrode 34 is formed by an apertured mask sheet 35 having a bent-over edge. The mask ring 36 having a corner portion 47 bent-over inwardly and having a lug 48 bent-over outwardly to improve magnetic screening, is connected to the edge of the mask sheet. The reinforcement strip 37 is connected to the corner portion 47. The leaf spring 38 is connected to the supporting strip 37 by means of a narrow intermediate member 49. The leaf spring 38 is very rigid in the plane of the spring itself, but comparatively flexible in a direction at right angles thereto. A carrier plate 39 is connected to the leaf spring 38 and comprises the already described triangular and rectangular apertures. The carrier plate 39 is placed on the supporting plate 30 and firmly held against the embossments on the supporting plate 30 by clamping member 42. When the clamping member 42 is moved over the supporting plate 30 and the carrier plate 39, the bent-over end 45 serves as a clamping spring. The bent-over lug 44 of clamping member 42 falls below the lower edge 50 of the metal plate 29 which is fixed by means of cement and to which the supporting plate 30 is connected. Lug 44 prevents the clamping spring 45 from sliding off the surface of the carrier plate 39. Upon disassembly of the colour selection electrode, which is necessary when providing the phosphor pattern on the display window, the clamping member 42 is detached by pressing the metal strip 46 toward the plate 43. As a resuilt of this the lug 44 is released and the clamping member 42 may be removed.

In addition to the above-described embodiment of suspension means for a colour selection electrode which is connected to a metal plate secured in chamber-like recess, other suspension means may be utilized. The suspension means itself is the subject matter of patent application Ser. No. 270,285 (PHN 9771) filed concurrently with this application.

Figure 4:
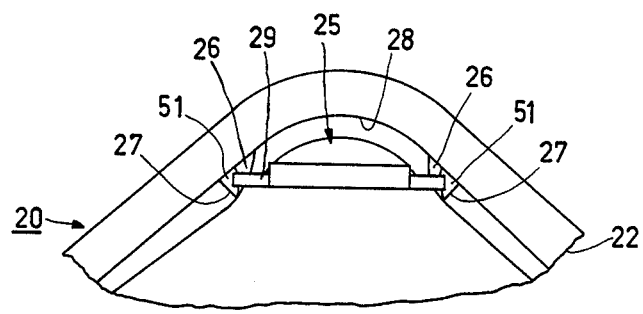
FIG. 4 is a plan view of the corner of the display window of FIG. 2.

FiG. 4 is a plan view of the corner of the display window shown in FIG. 2. For clarity, the connection of the supporting plate 30 and the suspension of the colour selection electrode 34 are not shown. The plate 29 is of a metal and has a coefficient of expansion which corresponds to that of glass. The plate 29 is made, for example, of a material commercially available as Vacofit 485 (48% Ni, 5% Cr, 47% Fe) or Nilo 475 (47% Ni, 5% Cr. 48% Fe). The plate 29 is fixed in the chamber-like recess 25 by means of a cement 51. The cement 51 is a cement consisting of a mixture of sodium silicate and magnesium silicate. This cement cures in a short time in air at a temperature of approximately 150° C. A cement curing at low temperature has the advantage that no expensive oven process for curing need be used. Curing may be effected simply, for example, by means of infrared lamps. Generally, cements may be used which satisfy the following requirements. The cement must readily adhere to the glass and preferably to metal. In order to improve the adhesiom of the cement to the metal plate, the plate may have ribs or small holes at its edge. The mechanical rigidity of the cement must be sufficiently to resist shocks experienced by the colour display tube. The coefficient of expansion of the cement must be of the order of magnitude of the coefficient of expansion of glass to prevent cracking of the display tube. In addition, the cement must be capable of withstanding the temperature treatments to which the display tube is subjected during manufacture. The cement must also have a sufficiently low gas emission that the operation of the tube is not disturbed. The cement preferably cures in a comparatively short time and at a low temperature. Cements which fulfill the above requirements are, for example, those composed of one or more of the binders sodium silicate, potassium silicate, aluminium phosphate or chromium phosphate to which one or more of the fillers steatite powder, sand, glass powder, alundum or magnesium oxide have been added.

The metal plate 29 is fixed in place as follows. After placing the plate 29 in the chamber-like recess 25, the spaces between the edges of the plate 29 and the sides 27 of the chamber-like recess 25 are filled with the cement 51. After the cement 51 has cured, the position of the plate 29 is fixed. Since the space between the plate 29 and the side walls 27 is filled with the cement, there are no stringent requirements as regards the shape and size accuracy of the metal plate 29 and the chamber-like recess 25. Since the smallest distance between the side walls 27 is smaller than the length of the metal plate 29, the cement bond is not tensile loaded. In the case of shocks or vibrations, the resulting forces are transferred directly to the metal plate by the side walls 27 of the chamber-like recess 25.

The position of the plate 29 can be adjusted very accurately and be maintained during curing by placing the plate in a jig. The position of the plate relative to the display window can be established with an accuracy of less than 100 μm. The accuracy with which the position of the plate has been adjusted can be used to advantage in particular in the manufacture of a colour television display tube.

In currently produced shadow mask tubes the colour selection electrode is manufactured by placing a mask ring comprising a number of suspension springs along its circumference on pins provided in the upright edge of the display window. As a result of this the position of the mask ring relative to the display window is fixed. A spacing jig is placed on the inside of the display window and the mask sheet is placed thereon. Along its circumference the mask sheet has an upright edge which overlaps the mask ring over some distance. The spacing jig determines the distance between the mask sheet and the display window. The mask sheet is then welded to the mask ring along its circumference. Sealing the pins in the upright edge of the display window, however, is a rather inaccurate process. The overlap of the upright edge of the mask sheet and the mask ring is used to obtain the correct distance between the colour selection electrode and the display window. A result of this method is that the relative positions of the colour selection electrode and the display window should not change during manufacturing processes of the display tube conducted after welding the mask ring and the mask sheet together.

By using a supporting plate for the suspension of the colour selection electrode which forms one assembly to be cemented, it is possible to use a different manufacturing process. In a separate set-up, mask rings and mask sheets are welded together in an unambiguous manner. For a given colour selection electrode the distance from the mask sheet to the display window is determined by the positions of the supporting plates relative to the display window. After adjusting these positions, the plates are cemented in the chamber-like recesses. In this manner the relative positions of the colour selection electrode and the display window are permanently only after the first exposure step in the so-called flow-coating. If a supporting plate for the colour selection electrode is separate from the plate to be cemented, a method similar to that mentioned above may be used for manufacturing a colour display tube. In this case the plates to be cemented may first be positioned comparatively inaccurately and then be cemented. In this case the distance from a colour selection electrode to the display window is determined by accurately connecting the supporting plate to the cemented plate, at the correct height relative to the inside of the display window.

What is claimed is:

1. A color display tube comprising a glass envelope including a rectangular display window, a rectangular color selection electrode and means for mounting the color selection electrode to the display window, said means comprising:
   (a) an upright rectangular flange of the display window having recesses formed in inner sides of respective corners thereof, each recess widening in a direction toward an outer side of its respective corner;
   (b) a metal plate disposed in each recess and having edges extending into the widest portion of the recess for securing the plate in place, said edges being fixed in place by means of a cement; and
   (c) a suspension member attached to each corner of the color selection electrode;
said metal plates and said suspension members including positively engaging attachment means for enabling the color selection electrode to be removably-attached to the display window.

2. A color display tube as in claim 1 where the cement is one which cures rapidly at a temperature below approximately 150° C.

3. A color display tube as in claim 1 or 2 where the cement includes at least one binder selected from the group consisting of sodium silicate, potassium silicate, aluminum phosphate and chromium phosphate, and further includes at least one filler selected from the group consisting of steatite powder, sand, glass powder, alundum or magnesium oxide.

* * * * *